A. L. STILLMAN.
APPARATUS FOR DRYING AND COOLING OF AIR.
APPLICATION FILED MAR. 22, 1916.
1,196,169.
Patented Aug. 29, 1916.
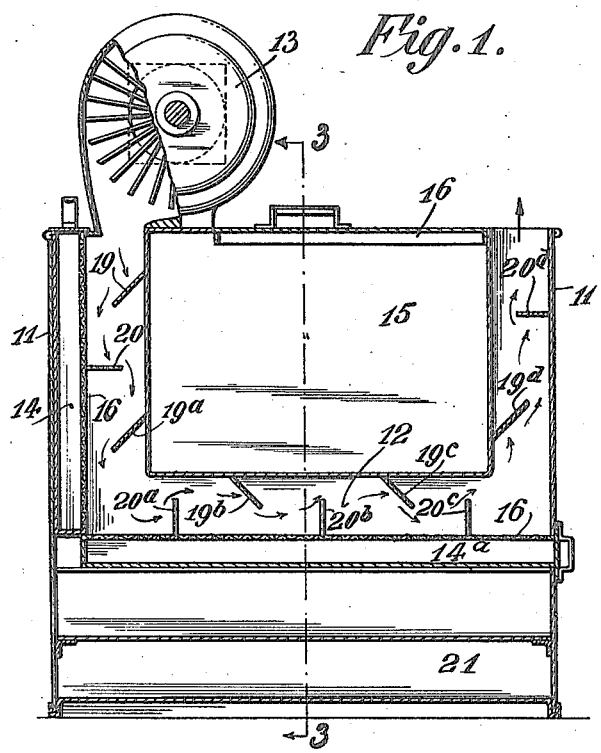
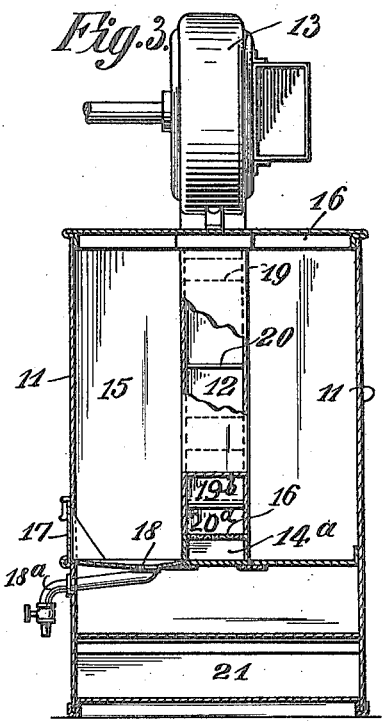
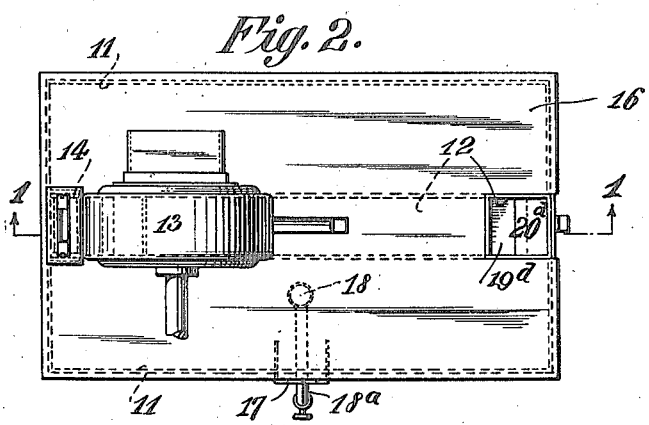

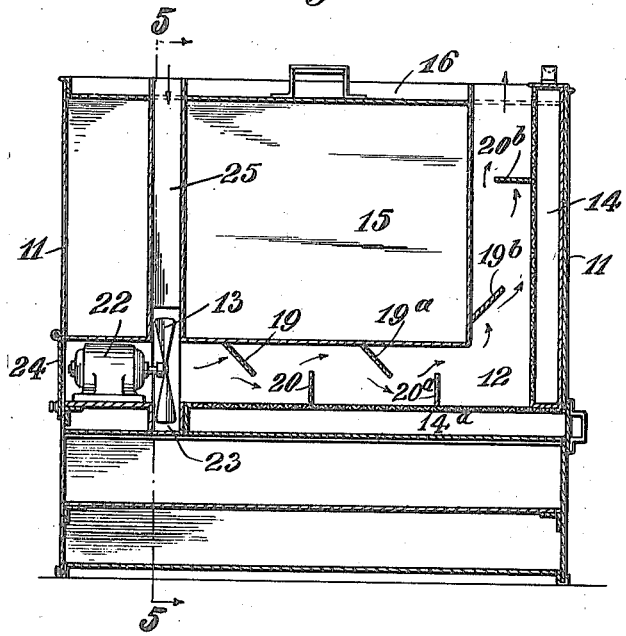
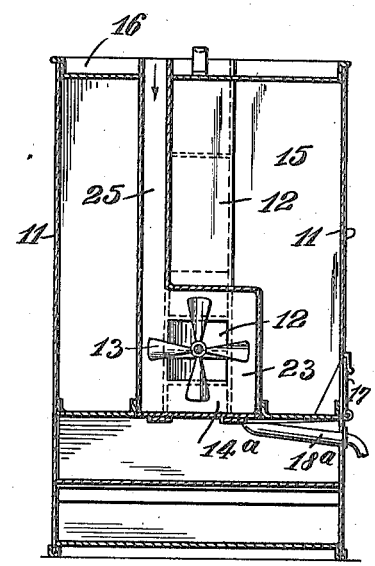
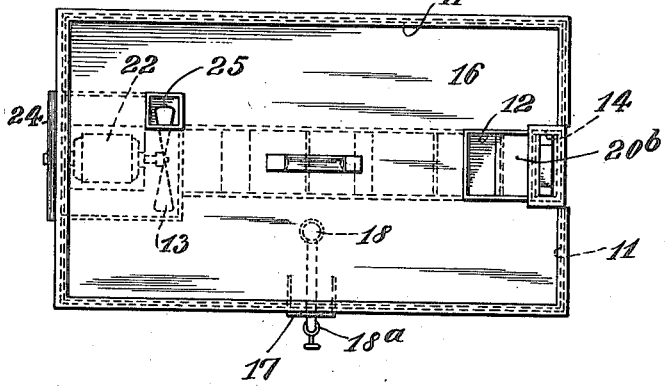

UNITED STATES PATENT OFFICE.

ALBERT L. STILLMAN, OF HOBOKEN, NEW JERSEY, ASSIGNOR TO ALLIANCE ENGINEERING CORPORATION, OF NEW YORK, N. Y., A CORPORATION OF NEW YORK.

APPARATUS FOR DRYING AND COOLING OF AIR.

1,196,169.      Specification of Letters Patent.     Patented Aug. 29, 1916.

Application filed March 22, 1916. Serial No. 85,868.

*To all whom it may concern:*

Be it known that I, ALBERT L. STILLMAN, a citizen of the United States, and resident of Hoboken, New Jersey, have invented certain new and useful Improvements in Apparatus for Drying and Cooling of Air, of which the following is a full, clear, and exact specification.

The invention herein set forth and claimed, relates to apparatus for drying of air, and more particularly to apparatus whereby the drying and simultaneous cooling of the air is effected.

Refrigerators are usually constructed to effect only the cooling of the air contained therein. This is not sufficient for cold storing of meats, foods, and other moisture containing articles, which are liable to rapidly deteriorate when exposed to damp air. To produce effective refrigerating, the air should be dry, and therefore means should be provided for drying it, because the air absorbs the moisture from such substances as are usually kept in refrigerators, and from the ice with which it comes in contact in the usual arrangement of ice boxes and the like. It is well known that the drier the air in a refrigerator, the better and longer meats and other foods can be preserved therein, and the object of my invention is an apparatus arranged to dry the air by absorption of its moisture, the apparatus withdrawing the damp air and returning dry air in its place. The air can also be simultaneously cooled.

The construction of my improved air drying apparatus is based on the principle, that the eliminating of moisture from air is facilitated and greatly augmented by subjecting the air to a mechanical action, producing a concussion, and by causing alternate compressions and expansions of the air while it flows in contact with a moisture absorbing chemical.

In the apparatus, herein shown and described, the mechanical action is effected by more or less forcibly projecting the air against an unyielding surface, interposed to its flow, and the alternately compressing and expanding it, while it is in contact with the moisture absorbing medium, is produced by reducing, at intervals, the area of the conduit, through which the air is circulated.

The apparatus is also provided with means for cooling the air, while it is thus being dried, and practical use of the apparatus has shown, that thereby a virtually dry air is produced, and sufficiently cooled to fully meet the requirements of an effective refrigeration, and to render any further cooling of it unnecessary.

Two forms of apparatus, constructed according to my invention, are illustrated in the accompanying drawings, wherein—

Figure 1 is a sectional view of one form of the apparatus on line 1—1, indicated in Fig. 2; Fig. 2 is a plan view thereof; Fig. 3 is a sectional view on line 3—3, indicated in Fig. 1; Fig. 4 is a sectional view of the other form of the apparatus; Fig. 5 a sectional view thereof on line 5—5, indicated in Fig. 4, and Fig. 6 a plan view thereof.

The apparatus, illustrated in Figs. 1 to 3, is arranged as follows:

Referring to Figs. 1, 2 and 3, the numeral 11 designates the casing, and 12 the air-duct, through which the air is driven by the fan or blower 13. An electric motor 22 is preferably provided for driving the blower. The air-duct is made preferably of sheet metal, suitably formed, the side facing the receptacles 14 and 14$^a$ being left open. The chamber 15, formed in the casing 11 and closed by lid 16, surrounds the air-duct, and may be filled with crushed ice and salt, or any other cooling compound, if the air is to be cooled as well as dehydrated. An opening, as for instance shown in Figs. 2 and 3, is provided for convenient cleaning of the chamber 15, or removal of the exhausted cooling medium therefrom. This opening is normally closed by the door 17, preferably hinged to the casing, and fastened when shut. In addition a drain opening 18 is provided in the bottom of chamber 15, and an outlet pipe 18$^a$ connected therewith.

Receptacles 14 and 14$^a$ are made preferably in the form of drawers, and set in correspondingly dimensioned slide-ways 15 in the casing 11. Their width corresponds to the width of the air-duct 12, which they complete, forming, so to say, one side thereof. The open sides of the receptacles 14 and 14$^a$, facing the air-duct 12, are covered with wire-cloth 16 to enable the moisture absorbing compound, as for instance, chlorid of calcium, to be retained therein, irrespective of the position in which the receptacles are set, and yet permit the air, driven through the air-duct, to come in intimate contact therewith.

The air is driven into the air-duct, at one end thereof, by the blower 13, and to effect the mechanical action upon it, and the condensation of the moisture contained therein, a plate 19 is set in the air-duct 12 at an obtuse angle to its axis, the blower 13 being set to drive the air directly against it. This plate 19 extends from the wall of chamber 15 and only partially across the air-duct, to allow the air to pass beyond, between it and the receptacle 14. Besides producing the concussion and partial compression of the air, the interposition of the plate 19 also tends to divert the air in intimate contact with moisture absorbing compound, charged in the receptacle 14, which acts thereon chemically.

The plate 20, set in the air-duct 12, at an approximately right angle to its axis, extends from the open side of receptacle 14 to about one-half of the width of the air duct. Its purpose is to again reduce the cross-sectional area of the air-duct at that point, and to deflect it in contact with the wall of the chamber 15, whereby its temperature is reduced. The positions of plates $19^a$, $19^b$, etc., correspond to that of the plate 19; the positions of plates $20^a$, $20^b$, etc., to that of the plate 20; their purpose is to produce alternate compression and expansion of the air, and to deflect it against the moisture absorbing compound contained in the receptacles 14 and $14^a$, to effect its drying and against the wall of chamber 15, to effect its cooling.

It is necessary to drive the air into the air-duct, and against the plate 19, quite forcibly, to produce the mechanical action, the concussion, whereby the precipitation of the moisture contained therein is effected, but it is also necessary to retard the passage of the air and to press it, so to say, in contact with the moisture absorbing medium, to obtain the best result of the operation. The plates $19^a$, $20^a$, $19^b$, $20^b$, etc., serve this purpose, and also obviate the necessity of unduly extending the air-duct, enabling the apparatus to be made more compact and permit its installation within the small space available therefor in refrigerators.

For the purposes of installation of the apparatus in the lower part of, or outside of, a refrigerator, the socket 21 is provided. When the apparatus is employed outside of the refrigerating chamber, the upper portion of the socket may be filled with insulating material, and such insulating material may also be applied to the outer walls of the casing 11. The apparatus is, however, intended to be located within the refrigerating chamber, and in that case, no insulating of any of its parts is required.

Figs. 4, 5 and 6, illustrate a modified form of my apparatus designed to be installed inside of a refrigerator. In this form the blower (fan) 13 is located in a pit 23, accessible through the door 24 in the side of the casing 11, and the air to be dried (and cooled) is drawn through the shaft of flue 25, extending through the chamber 15. In this modified form of my improved apparatus the lid 16 is made hollow and serves as an additional receptacle for the moisture absorbing compound, the air impinging thereon as it is being drawn into the flue 25. In all other respects, the construction and arrangement of the apparatus are the same as described above. Also the operation of both forms of apparatus is the same. The progress of the air, driven by the blower, or fan, into the air-duct 12, is indicated by arrows in Figs. 1 and 4 of the drawings. By the forcible impact of the air current upon the plate 19 a concussion, and a partial compression of the air are produced. Thereby the capacity of the air to hold the moisture is reduced and a precipitation of the moisture from the air is effected. The air being at the same time brought into intimate contact with the moisture absorbing compound, contained in the receptacle 14, the moisture precipitated therefrom, and also some of the moisture still suspended in the air, is then chemically absorbed. After passing through the reduced passage between the end of the plate 19 and the receptacle 14, the air enters the wider space between it and the plate 20. There the air expands and its velocity is further diminished. The alternate compressing and expanding of the air, and diverting it in its passage through the air-duct, to pass alternately in contact with the dehydrating compound in the receptacles 14 and $14^a$, and again in contact with the wall of chamber 15, may be repeated as many times as might be necessary to effect its complete dehydration and cooling, this depending upon the condition in which the air is, that is, its temperature and contents of moisture at its entering into the air-duct. I have found, however, in the course of my experiments, and in practical use of my apparatus, that it is sufficient to repeat this operation only twice, or three times, at the utmost, to eliminate practically all moisture therefrom, and also to effect its being cooled to such a degree, as required for any industrial purpose. The propulsive force of the blower 13 is sufficient to drive the air with a velocity required to produce successive impacts upon the plates $19^a$ and $19^b$, etc., and for pressing the air in intimate contact with the moisture absorbing medium, and with the walls of the cooling chamber 15. Nor is the propulsive force of the blower 13 exhausted by thus forcing the air through the air-duct, sufficient force remaining to expel the air at the outlet end of the air-duct with such velocity as required to cause it to pass up, or to flow wherever it may be directed.

While I believe that the simultaneous cooling of the air assists in extracting the moisture, it is not essential to combine, in one apparatus, the means for cooling the air with the means for dehydrating it, though for the particular purpose of circulating dry and cold air through a refrigerator, it is convenient and advantageous to do so, and may also be considered more efficient in practical use.

I claim as my invention:

1. An apparatus for dehydrating of air, comprising an air-duct, an open receptacle in the wall of the air-duct, a moisture absorbing compound in the receptacle, plates set in the air-duct in the path of the flow of the air therethrough, and reducing the cross-sectional area of the air-duct at intervals, and deflecting the flow of the air against the moisture absorbing compound in the receptacle, and means for driving the air through the air duct; substantially as herein shown and described.

2. An apparatus for dehydrating of air, comprising an air-duct, an open receptacle partly inclosing the air-duct, a moisture absorbing compound in the receptacle, plates set up in the air-duct at an obtuse angle to its axis, opposite the receptacle; other plates, set in the air-duct over the receptacle, approximately midway between the first; both sets of plates reducing the cross-sectional area of the air-duct at intervals, and means for driving the air through the air-duct; substantially as herein shown and described.

3. An apparatus for dehydrating and cooling of air, comprising a casing, adapted to be filled with a cooling medium, an air-duct, and open receptacles partly inclosing the air-duct in the casing; a moisture absorbing compound in the receptacles, plates set up in the air-duct in the path of the flow of the air-duct, and reducing the cross-sectional area of the air-duct at intervals, and means for driving the air through the air-duct; substantially as herein shown and described.

4. An apparatus for dehydrating and cooling of air, comprising a casing, adapted to be filled with a cooling medium, an air-duct, and open receptacles set in the casing and partly inclosing the air-duct, a moisture absorbing compound in the receptacle, plates set up in the air-duct at an obtuse angle to its axis opposite the receptacles; other plates, set in the air-duct over the receptacles, approximately midway between the first; both sets of plates reducing the cross-sectional area of the air-duct at the points where they are set, and means for driving the air through the air-duct; substantially as herein shown and described.

ALBERT L. STILLMAN.

Witnesses:
MINNIE C. REUTER,
LOUISE KELLER.